US010924387B2

(12) United States Patent
Tamizkar

(10) Patent No.: US 10,924,387 B2
(45) Date of Patent: Feb. 16, 2021

(54) METHOD AND APPARATUS FOR PREVENTING LOOPS IN A NETWORK TOPOLOGY

(71) Applicant: Telia Company AB, Solna (SE)

(72) Inventor: Babak Tamizkar, Stockholm (SE)

(73) Assignee: Telia Company AB, Solna (SE)

( * ) Notice: Subject to any disclaimer, the term of this patent is extended or adjusted under 35 U.S.C. 154(b) by 0 days.

(21) Appl. No.: 16/437,150

(22) Filed: Jun. 11, 2019

(65) Prior Publication Data

US 2020/0036622 A1 Jan. 30, 2020

(30) Foreign Application Priority Data

Jul. 25, 2018 (SE) ...................................... 1850941

(51) Int. Cl.
*H04L 12/705* (2013.01)
*H04L 12/741* (2013.01)

(52) U.S. Cl.
CPC .............. *H04L 45/18* (2013.01); *H04L 45/74* (2013.01)

(58) Field of Classification Search
CPC ......... H04L 45/18; H04L 45/74; H04L 45/66; H04L 45/02
See application file for complete search history.

(56) References Cited

U.S. PATENT DOCUMENTS

| 8,681,641 | B1 * | 3/2014 | Sajassi | ................ | H04L 12/4641 370/249 |
| 2003/0037163 | A1 * | 2/2003 | Kitada | ................ | H04L 61/6022 709/236 |
| 2006/0291480 | A1 * | 12/2006 | Cho | .................... | H04L 12/4641 370/397 |

(Continued)

FOREIGN PATENT DOCUMENTS

WO WO 2006/047223 A2 5/2006

OTHER PUBLICATIONS

Marian Klas: "Cisco FabricPath Technology Introduction", Dec. 31, 2011, pp. 1-25, XP055645978, retrived from the internet : URL:https://www.cisco.com/c/dam/global/sk_sk/assets/expo201 1/pdfs/ Cisco_ FabricPath_MarianKlas.pdf—(Relevant to Claims 1-8 ) (Year: 2011).*

(Continued)

*Primary Examiner* — Jeffrey M Rutkowski
*Assistant Examiner* — Chae S Lee
(74) *Attorney, Agent, or Firm* — Burr & Forman LLP; Jeffrey H. Kamenetsky

(57) ABSTRACT

The embodiments herein relate to a method and a network switch device for preventing the occurrence of loops in a network topology comprising a plurality of network switch devices, each switch device is assigned a unique SW-ID. The method comprises exchanging each SW-ID between all switch devices; and building, for each switch device, a routing table. The method further comprises when receiving, at a first switch device, a data frame from a second switch (Continued)

device that includes an SS-ID, assigned to the second switch device, and the data frame is received at a port of the first switch device, if, according to the routing table of the first switch device, the assigned SW-ID for this port is different from the SS-ID included in the data frame, discarding the data frame, otherwise, processing forward the data frame.

5 Claims, 7 Drawing Sheets

(56) References Cited

U.S. PATENT DOCUMENTS

2013/0039218 A1\* 2/2013 Narasimhan ............ H04L 45/74
370/255

OTHER PUBLICATIONS

Office Action dated Feb. 22, 2019, for Swedish Application No. 1850941-4, Swedish Patent and Registration Office.
Extended Search Report, Application No. 19179290.2-1215, dated Dec. 3, 2019, European Patent Office, Munich, Germany.
Marian Klas: "Cisco FabricPath Technology Introduction", Dec. 31, 2011, pp. 1-25, XP055645978, retrived from the internet: URL:https://www.cisco.com/c/dam/global/sk_sk/assets/expo2011/pdfs/Cisco_FabricPath_Marian_Klas.pdf—(Relevant to Claims 1-8).
Anonymous et al: RFC 6329—IS-IS Extensions Supporting IEEE 802.1aq Shortest Path Bridging, Apr. 1, 2012, XP055316996, Retrieved from the Internet: URL:https://tools.ietf.org/html/rfc6329 (Relevant to Claims 1-8).

\* cited by examiner

METHOD AND APPARATUS FOR PREVENTING LOOPS IN A NETWORK TOPOLOGY

TECHNICAL FIELD

The present disclosure relates to the field of data communications, and in particular to a method, and an apparatus in the form of a network switch device for preventing the occurrence of loops in a network topology.

BACKGROUND

Switching is an approach of delivering data frames across the network. Switching methods decide how a switch device receives, processes, and forwards the frames. A hub device and a repeater device work at Layer 1 (Physical layer). These devices only understand the signals. Signals received on incoming port are forwarded from all available ports.

A switch device works at Layer 2 (Data Link Layer). A switch is capable of reading frames. Switching is a method of dealing with frames. Switching is described in Layer 2 (L2) of the OSI (Open Systems Interconnection) model. When a data frame enters into a port of the switch device, the switch device checks the FCS (Frame checksum sequence) field of the data frame and processes it only if it is valid. All invalided data frames are automatically dropped. All valid data frames are processed and forwarded to their destination MAC (Medium Access Control) address.

A switch device performs three main tasks:
learn where devices are located and store their location (addresses) in a MAC table;
Forward the frame intelligently based on MAC address of a data frame; and
remove layer 2 loops.

A challenge in switching technology is "loop prevention." Having a loop in L2 domain may cause a severe issue and bring down the network quickly. There are three issues when there is a loop in a L2 network:
1) Broadcast/Unknown-unicast storm;
2) Frame duplication; and
3) MAC address table corruption.

In order to understand why a L2 loop can cause issues, below is a description on how a switch operates. The standard procedure in switching technology includes:
A) When a switch device receives a data frame, it looks at the L2 part of the frame which includes a source and a destination MAC address, as previously described.
B) The switch device has a MAC Address table that includes the MAC address of a node and a local port on the switch device to reach to that node directly or indirectly connected.
C) When the switch device receives a data frame, it looks at the source MAC address field of that frame before it sends the frame out. Then the switch device inserts the source MAC address and the receiver port's number into its MAC address table if it is not already inserted.
D) If the switch device receives a broadcast frame, regardless of the source of that data frame, the switch device floods that frame on all its ports except the port from which the packet arrived.
E) If the switch device receives a data frame and there is no entry in its MAC address table for the destination (Unknown-unicast), the switch device floods that frame on all its ports except the port which the packet arrived, regardless of the source of that frame
F) Based on the model of the switch device, switch's MAC address table has a limitation on how many entries it can store. If the switch's MAC address tables becomes full, it starts to replace the new entries with the top old ones.
G) Based on the model of the switch device, switch's MAC address table entries have an "aging time", i.e., for how long entries are stored in the MAC table. This means that if there is no update for an entry, for a defined time, the switch device removes it from its MAC address table. A non-limiting example of an aging time is 5 minutes.
H) When reloading or restarting or resetting a switch device, the switch MAC address table is flushed.

In view of the above, if a loop occurs in the network, a broadcast frame or an unknown-unicast frame can be regenerated and forwarded forever in a L2 domain. This is known as a storm which immediately brings the network down because either the link's bandwidth gets full or the switch device is unable to process such an unlimited and growing number of data frames. In addition, a loop may cause two other issues:

A single data frame may reach to a destination two times or more. This is called Frame duplication.
A switch device may have to change continuously an entry for a specific node in its MAC address table. This is called MAC address table corruption.

To better visualize the loop issues as explained above, FIG. 1 illustrates an example of a network topology including three switch devices, denoted SW-A, SW-B, and SW-C. Also shown are three host nodes N-X, N-Y and N-Z each connected to a respective switch device. N-X is connected to SW-A, N-Y is connected to SW-B and N-Z is connected to SW-C. As shown, a host node may be a server, a personal computer, a laptop or any suitable host node. In this example, each switch is provided with 3 ports. For example, SW-A is provided with port 8 for receiving and sending data frame to host node N-X. SW-A is provided with two additional ports port 1 and port 2. Port 1 is used towards SW-C and port 2 is used towards SW-B.

Assuming now that host node N-X sends out an ARP (Address resolution Protocol) request in order to fetch the MAC address of another host node/device, e.g., of host node N-Z which is shown connected to SW-C. An ARP request is a type of a broadcast frame. SW-A receives the ARP request from N-X and then following occurs:
a) Switch device SW-A floods the broadcast data frame on all of its ports except the coming one which is port-8. Hence two data frames are generated by SW-A and sent out. One broadcast frame from port 1 (towards SW-C) and one broadcast frame from port 2 (towards SW-B).
b) Switch device SW-B and SW-C each receive the broadcast frame and since this is a broadcast frame they do the same, which means that SW-B floods the frame on its port 1 and its port-8 and SW-C also floods the frame on its port 2 and its port-8. So, SW-C receives the frame from SW-B and SW-C receives the frame from SW-B.
c) Now, again, SW-B and SW-C flood that frame to SW-A.

As is clear from above, this flooding is repeated again and again. The term flooding means sending the frame.

It should be noted that even if node N-X knows the MAC address of N-Z and sends a unicast frame to SW-A intended for N-Z and if SW-A has no entry for N-Z in its MAC address table, this unicast frame is considered as an unknown-unicast frame to the switch SW-A. So the switch floods it like a broadcast frame.

There are two standard well-known protocols to address switching loop issues, STP and TRILL, which both deal with loop prevention.

1. Physically Loop Prevention by STP (Spanning Tree Protocol)

The idea behind STP is very straightforward. It detects the loop by exchanging some special frames called Bridge Protocol Data Unit (BPDU) frames which include information about STP. For STP to function, the switches need to share information about themselves and their connections. What they share are BPDUs. BPDUs are sent out as multicast frames to which only other layer 2 switches (or bridges) are listening. If any loops (multiple possible paths between switches) are found in the network topology, the switches will co-operate to disable a port or ports to ensure that there are no loops; that is, from one device to any other device in the layer 2 network, only one path can be taken.

STP works well but it has some drawbacks which include:

As STP blocks as many ports as possible to make the domain loop free, the network topology loses some part of operational and valuable bandwidth. For instance, in our example, STP has to disable at least one link to prevent a loop. In this case one out of three links get disabled which means there is a loss of around 33% of our bandwidth and network capacity. FIG. 2 illustrates this scenario where the link between port 1 of SW-A and port 1 of SW-C is disabled.

As STP has to block one or more links to make the domain loop free, there is no guaranty that frames take the shortest path from a source to a destination. For instance, in the example of FIG. 2, if a frame needs to reach from N-X to N-Z it has to pass this long path:

N-X->SW-A->SW-B->SW-C->N-Z

While there is a shorter path:

N-X->SW-A->SW-C->N-Z which is shown blocked/disable by STP in order to prevent the loop.

Because STP physically makes the domain loop free, there is only one single path from a source to a destination. Due to that, there is no load balancing in an STP domain.

The convergence time in STP is high. This means that it is very slow to react if any link failure occurs. For example, if one of the active ports in an STP domain goes down, around thirty second to one minute may elapse until an alternative port gets up and make the network operational again. So in this case there is no service for around one minute which is not accepted these days. This may be called a "Freezing Period."

STP doesn't require manual configuration by a user to work, however in real production networks, STP can get very complicated and useless. So users may be required to do manual configuration and change or apply additional STP features like Root Bridge ID, BPDU Guard, BPDU Filter, Port Fast, Uplink Fast, Backbone Fast, Root Guard, Loop Guard, and so on to achieve better benefits of STP.

2. Logically Loop Prevention by TRILL (TRansparent Interconnection of Lots of Links)

In comparison with STP, TRILL works more efficiently.

For instance, in TRILL, all available links are active and operational and because of that there is no waiting time in services if any port goes down. TRILL also supports EMCP (Equal-cost multi-path routing. But TRILL also has some drawbacks:

In order to implement TRILL, a special routing protocol known as IS-IS (Intermediate System-Intermediate System) needs to be run over the network. Even IS-IS is an L2 Intra Domain Routing Protocol but not only it should run over enterprise switches but also users need to have at least some basic knowledge about it.

TRILL is an encapsulation (tunneling) method. So each frame needs to be encapsulated using a TRILL header in order to travel along the network. The result is longer data frame size and more overhead for bandwidth and switching processes. Also TRILL requires a special type of switch to support this.

TRILL is specially designed for Data Center networks and in reality it is not possible or feasible to use it in any other network than a Data Center, due to the complexity and high costs.

In view of the above, there is need for a new method, and an apparatus for preventing loops in a network topology that solve at least some of the problems described above.

SUMMARY

It is an object of embodiments herein to solve the above problems by providing a methods and an apparatus in the form of a switch device for preventing loops in a network topology.

According to an aspect of embodiments herein, there is provided a method for preventing loops in a network topology comprising a plurality of switch devices assigning, to each switch device, a unique switch identification number, SW-ID, exchanging each SW-ID between all switch devices, building, for each switch device, a routing table based on said received SW-IDs, so that switch devices can reach each other, wherein each entry in the routing table is associated with a switch device, and includes an assigned SW-ID of the switch device, a dedicated port number and a number of hops to reach the switch device, wherein the number of hops corresponds to the shortest path to reach the switch device. The method further comprises when receiving, at a first switch device, a data frame, from a second switch device, that includes a source switch identification number, SS-ID, assigned to the second switch device, and the data frame is received at a port of the first switch device, if, according to the routing table of the first switch device, the assigned SW-ID for this port is different from the SS-ID included in the data frame, discarding the data frame, otherwise, processing forward the data frame.

According to an embodiment, further processing includes: if the data frame is a broadcast frame or an unknown-unicast frame, flooding the data frame out from each port of the first switch device that is connected to other switch devices except from the port from which the data frame was received, and removing the SS-ID from the data frame and flooding the data frame without the SS-ID frame out from each port of the first switch device that is directly connected to at least one host node. If the data frame is a known-unicast frame, forwarding the data frame out from a single port which is not the port from which the data frame was received.

In detail, if the data frame is a known-unicast frame, the method comprises checking, using the routing table of the first switch device, if there is any SW-ID assigned to a port number that is associated with a MAC destination address in the data frame, and if there is no SW-ID, removing the SS-ID from the data frame and forwarding the data frame, out from said associated port, to its destination MAC address, and if there is a SW-ID, forwarding the data frame to the switch device having the SW-ID.

According to another aspect of embodiments herein, there is provided a switch device for preventing loops in a network topology comprising a plurality of switch devices, wherein each switch device is assigned a unique switch-identification number, SW-ID, the switch device comprising a processor and a memory, said memory containing instructions executable by the processor wherein the switch device is operative to exchange the assigned SW-ID with all switch devices, receive from each switch device its assigned SW-ID, build a routing table based on said received SW-IDs, wherein each entry in the routing table is associated with a switch device, and includes an assigned SW-ID of the switch device; a dedicated port number and a number of hops to reach the switch device, wherein the number of hops corresponds to the shortest path to reach the switch device. When the switch device receives a data frame from another switch device that includes a source switch identification number, SS-ID, assigned to said another switch device, and the data frame is received at a port of the switch device, if, according to the routing table of the switch device, the assigned SW-ID for this port is different from the SS-ID included in the data frame, the switch device is operative to discard the data frame, otherwise, process forward the data frame.

An advantage with embodiments herein is that there is no need to disable any link between switch devices and hence all links are up and operational, and still loops are efficiently prevented. In addition any type of data frames be it a broadcasting frame, an unknown-casting frame or a known-unicasting frame, can be handled. Further, a freezing period is no longer needed.

Another advantage with embodiments herein is that data frames use the shortest path to reach to a destination from a source. In addition, the method herein works in complex networks (such as a data center) as well as in simple networks. Manual configuration by a user can be eliminated.

Yet another advantage with the embodiments herein is that encapsulation or tunneling of data frames is not required.

Another advantage with the embodiments herein is that frame duplication at a destination node does not occur.

Additional advantages achieved by the embodiments herein will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Hereinafter, is described, according to embodiments herein, a new method for preventing loops in a network topology. The method may be referred to as ILSP which stands for Intelligent Loop-Free Switching Protocol. Decisions taken by switch devices are based on rules as will be explained.

Figure 2:
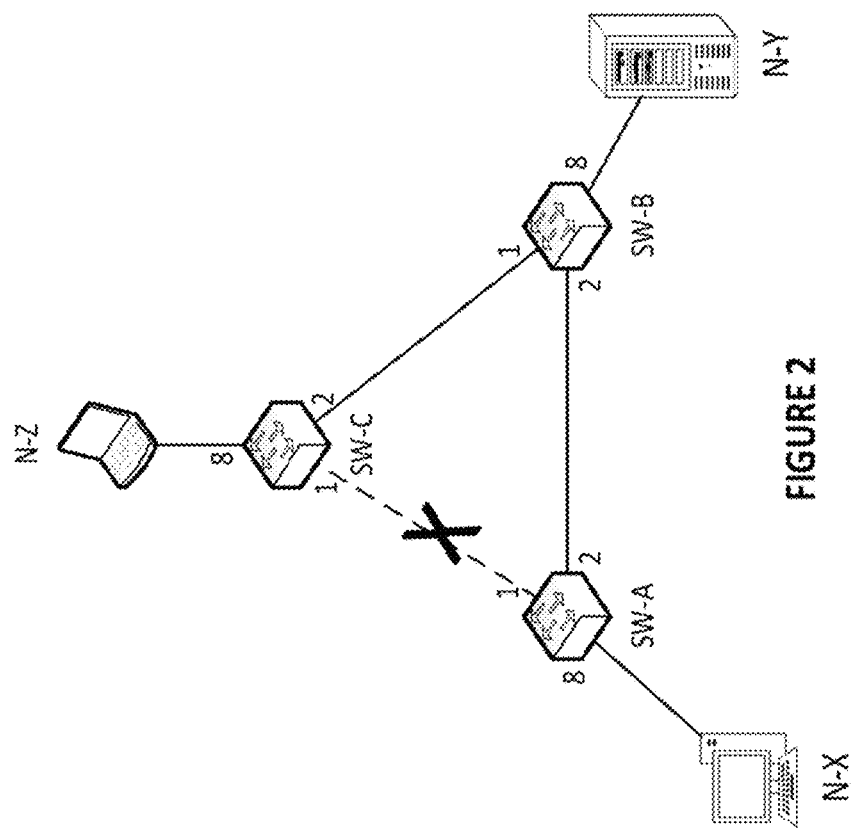
FIG. 2 is an example of the network topology of FIG. 1 wherein a link is disabled using STP for preventing loops.
Figure 1:
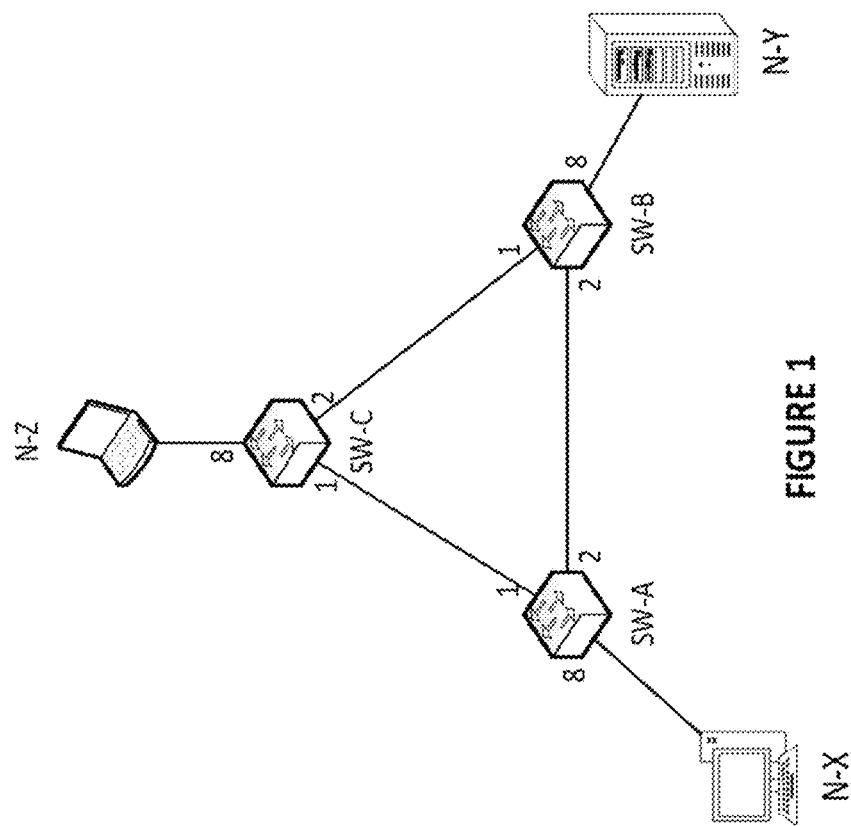
FIG. 1 is an example of a network topology comprising three switch devices.
Figure 3:
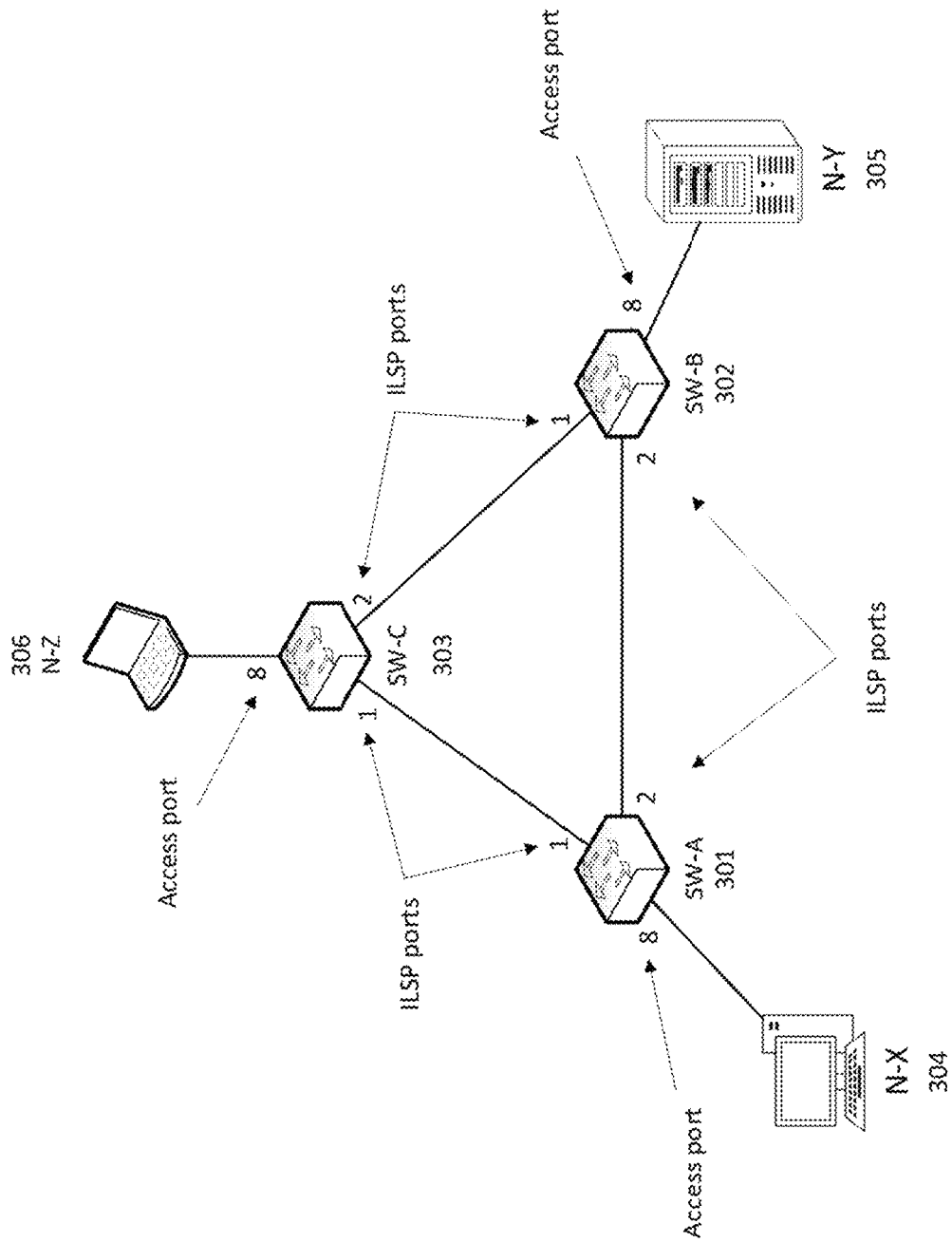
FIG. 3 is an example of a network topology wherein embodiments of the present invention may be employed.

The following terminology is used:

ILSP port: a port of a switch device receiving or sending a data frame from/to another switch device. In FIG. 3, port 1 and port 2 of switch devices SW-A 301 or SW-B 302 or SW-C 303 are ILSP ports.

Access port: a port of a switch device directly connected to host device(s). In FIG. 3, port 8 of each of the switch devices SW-A 301, SW-B 302 and SW-C 302 is an access port.

SW-ID: a unique switch identification number assigned to a switch device. In FIG. 3, SW-A is the SW-ID of switch device A 301, SW-B is the SW-ID of switch device B 302 and SW-C is the SW-ID of switch device C 303.

SS-ID: a source switch identification number assigned to a switch device. This SS-ID is included/injected in the data frame by the source switch device prior to transmission and the SS-ID does not change in the entire path between the source switch device and a destination switch. Hence, every switch device has a unit SW-ID but the ID which is inside a data frame is the SS-ID.

SR-Table: a switch routing table. Each switch device has its own SR-Table.

Host node: A host node is not a switch device. A host node is connected to an access port of a switch device. In FIG. 3, host node N-X 304 is connected to SW-A 301; host node N-Y 305 is connected to SW-B 302 and host node N-Z 306 is connected to SW-C 303.

The ILSP method according to some embodiments herein works by creating a shortest switching path between a source switch and a destination switch in the network topology. Then it tracks data frames by using a new field (SS-ID) in the data frame. Based on from which port(s) the data frame arrives, a switch device applies some rules to the data frame to make a decision on whether the data fame should be flooded, forwarded or discarded. By using this technique and using said rules, broadcast frames, unknown-unicast frames and/or unicast frames are handled in an efficient way and no loop or other traditional issues can bring the network down.

In the following, a more detailed overview of the method based on ILSP will be described in accordance with some embodiments herein followed by an example applying the principles of the present invention in a network topology such as the one shown in FIG. 3.

The overview steps of ILSP include:
1) All switches in an ILSP Domain start to negotiate with each other to build a Switching Routing Table (SR-Table), so that each switch knows through which local port (ILSP port) it can reach to any other switch device with shortest path. An ILSP domain, herein, includes all switch devices in the network topology who participate in ILSP.
2) Some rules apply to incoming and outgoing frames to make the right decision.
3) The switch device, before it sends out a data frame it injects its SS-ID as a new field into the data frame.

4) Every switch device that receives such a data frame looks at this SS-ID field and based on its SR-Table and considering its MAC Address table, it applies some predefined rules, and makes a decision on how to handle the data frame. The data frame may be any type of frame including broadcast, unknown-unicast, or known-unicast.

Step 1: Creating SR-Table (Switching Routing Table)

As previously described, each switch device has its unique SW-ID. Each switch device in the network topology is configured to exchange its SW-ID to all other switch devices. Hence, an exchange of each SW-ID is performed between all the switch devices. This is used to build or create a SR-Table. This may be performed by a distance vector routing protocol, such as RIP (Routing Information Protocol), or any other suitable routing protocol. After this phase, every single switch device in the ILSP domain will have its own SR-Table. For example, based on the topology shown in FIG. 3, the SR-Table for switch device A 301 having SW-ID=SW-A is as shown below:

SR-TABLE "A"

| Destination | Port | Hop |
| --- | --- | --- |
| SW-B | 2 | 1 |
| SW-C | 1 | 1 |

The first entry (first row) in the SR-Table of switch device SW-A 301 is associated with a switch device that is connected to SW-AA 301, which is switch device B 302, having SW-ID=SW-B that is assigned to switch device B. This entry also includes a dedicated port number (port 2) of switch device A 301 for reaching switch device B 302, and the number of hops to reach switch B 302, which in this case is one hop. Hence, if a data frame on SW-A 301 wants to reach to SW-B 302, the shortest path is through port 2 (ILSP port 2) and the distance is one hop. One hop means it is directly connected with no switches in-between. The SR-Table for switch B 302 and the SR-Table for switch device C 303 are shown below:

SR-TABLE "B"

| Destination | Port | Hop |
| --- | --- | --- |
| SW-A | 2 | 1 |
| SW-C | 1 | 1 |

SR-TABLE "C"

| Destination | Port | Hop |
| --- | --- | --- |
| SW-B | 2 | 1 |
| SW-A | 1 | 1 |

It should be noted that a switch device may include any number of ports and a network topology may include any number of switch devices. The embodiments herein are therefore not restricted to any number of ports (ILSP ports or access ports) or any number switch devices or any number of host nodes or devices connected to the switch devices.

As previously described, there are some rules that are applied by switch devices depending on whether a data frame is received by a switch device or is leaving a switch device. Below are described two main rules, Rule 1 and Rule 2. Rule 1 applies on ingress switch ports of a switch device and includes sub-rules Rule 1a)-1c). By ingress switch ports it is meant when the switch device receives a data frame. Rule 2 applies on egress switch ports and includes sub-rules Rule 1a)-1d). By egress switch ports it is meant when the switch device wants to send out a data frame.

Step 2: Rules for Making Decision(s) According to Some Embodiments Herein

Rule 1: Apply on Ingress Switch Port(s) of a Switch Device

Rule 1a).

If a switch device receives a data frame from an access port (i.e., the data frame is received from a host node), the switch device accepts the data frame for further processing. This data frame does not include an SS-ID.

If a switch device receives a data frame from an ILSP port (i.e., the data frame is received directly from another switch device), the data frame includes an SS-ID inside the frame. In this case the switch device uses its SR-Table and performs a look up.

Rule 1b).

If, according to the SR-Table, the associated or assigned SW-ID for this ILSP port is the same with the SS-ID included in the data frame, the data frame gets accepted by the switch device for further procedure/processing.

Rule 1c).

If the associated or assigned SW-ID for this ILSP port is different from the SS-ID in the data frame, the data frame is discarded with no additional process.

Rule 2: Apply on Egress Switch Ports of a Switch Device:

If a switch device wants to send out a data frame on an access port (i.e., this port is not directly connected another switch node):

Rule 2a).

If there is already an SS-ID inside the data frame, the switch device removes it and sends the data frame to a host node.

Rule 2b).

If there is no SS-ID inside the data frame, the switch device sends out the frame as it is.

If a switch device wants to send out a frame on an ILSP port (i.e., this switch device is directly connected to another switch device):

Rule 2c).

If there is no SS-ID inside the data frame, the switch includes/injects/adds as SS-ID its own SW-ID into the data frame before sending the frame out.

Rule 2d).

If there is already an SS-ID inside the frame, the switch device just sends out the frame as it is.

Steps 3-4: Applying the Principles of the ILSP Method According to Embodiments Herein Now that the rules have been described, the general principles of the ILSP method will now be described in conjunction with the flowcharts shown in FIGS. 4, 5 and 6.

Figure 4:
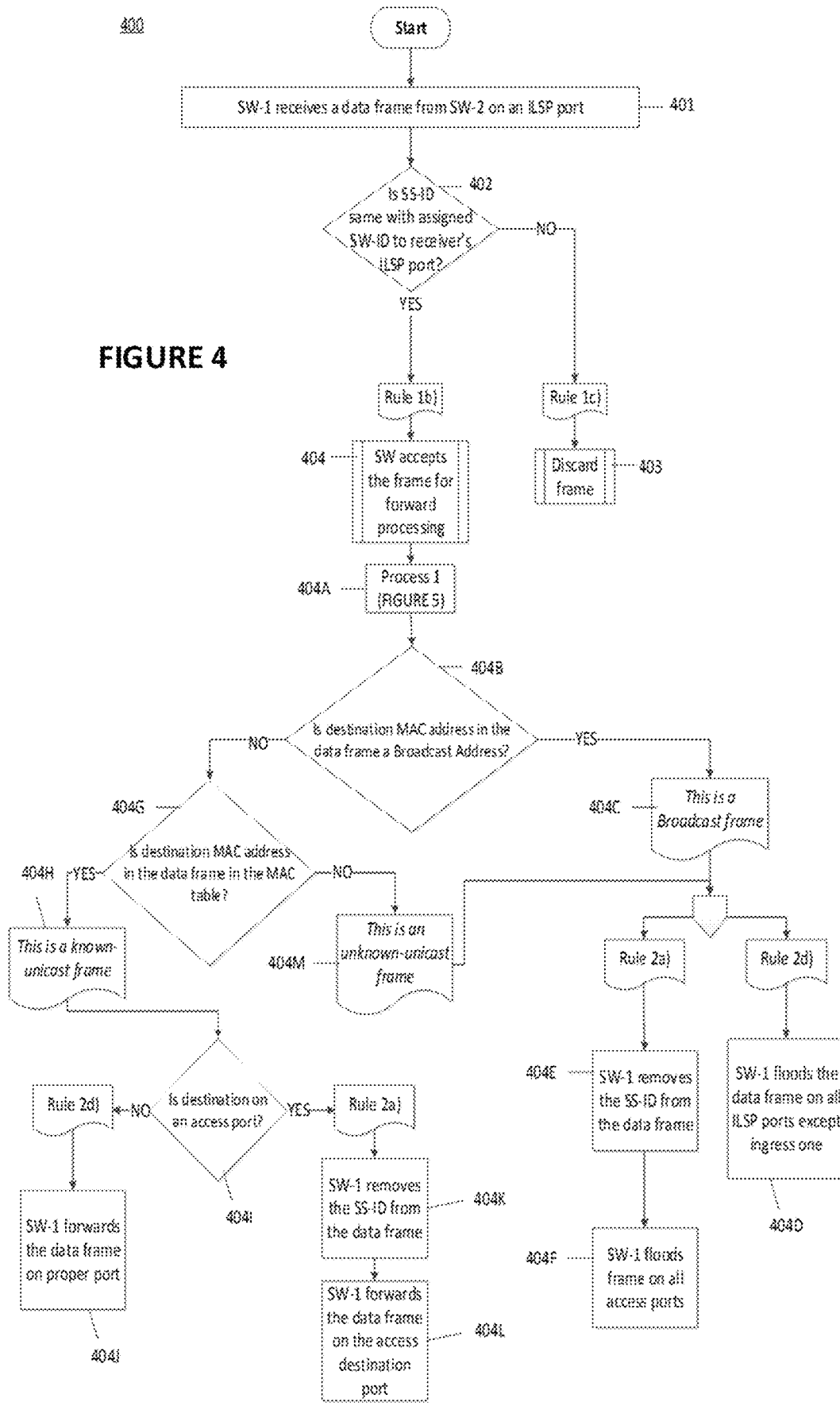
FIG. 4 is a flowchart illustrating different scenarios making use of the method according to the embodiments herein.

FIG. 4 illustrates a flowchart of a method according to embodiments herein. This scenario describes the case when a switch device, denoted SW-1, receives a data frame from another switch device SW-2 that is connected to SW-1. SW-1 hence receives the data frame on an ILSP port. SW-1 or SW-2 may be any of switch devices 301, 302, 303 shown in FIG. 3. This scenario also relates to the case when the data frame received by SW-1 already includes an SS-ID. Later on, with reference to FIG. 6 will be described the case when a switch device includes/adds an SS-ID in the data frame.

As previously explained, each switch device has an assigned unique SW-ID and an own routing table (SR-table) and an own MAC address table. An example of an (empty) data frame is shown below. It includes a field for a MAC destination address, a field for MAC source address at Layer 2, a ILSP field for the SS-ID, a Layer 3 and FCS which stands for Frame Check Sequence which may be used for error-detection. Note that the data frame may include additional data/information such as a payload, etc. But for simplicity and for easier understanding the principles of the method according to the embodiments herein, such additional data/information are not discussed.

Example of a Data Frame:

| L 2 | | ILSP | L 3 | FCS |
|---|---|---|---|---|
| Destination MAC | Source MAC | SS-ID | . . . | . . . |
| . . . | . . . | . . . | | |

In step 401: SW-1 receives a data frame from SW-2 on an ILSP port. This data frame includes the SS-ID assigned to SW-2. SW-2 includes as SS-ID its own SW-ID.

In step 402: SW-1 checks using its SR-table if the assigned SW-ID for this ILSP port is the same or is different from the 55-ID in the received data frame.

In step 403. If the answer is NO, i.e., the SW-ID is different from the SS-ID, Rule 1c is applied which means that the data frame is discarded with no additional process thus preventing loops to occur in the network topology independently on the type of frame that is received by SW-1.

If the answer is YES, i.e., the SW-ID the same as the SS-ID in the data frame, a forward processing of the data frame is performed (step 404).

Step 404 includes different sub-steps which will now be described.

Figure 5:
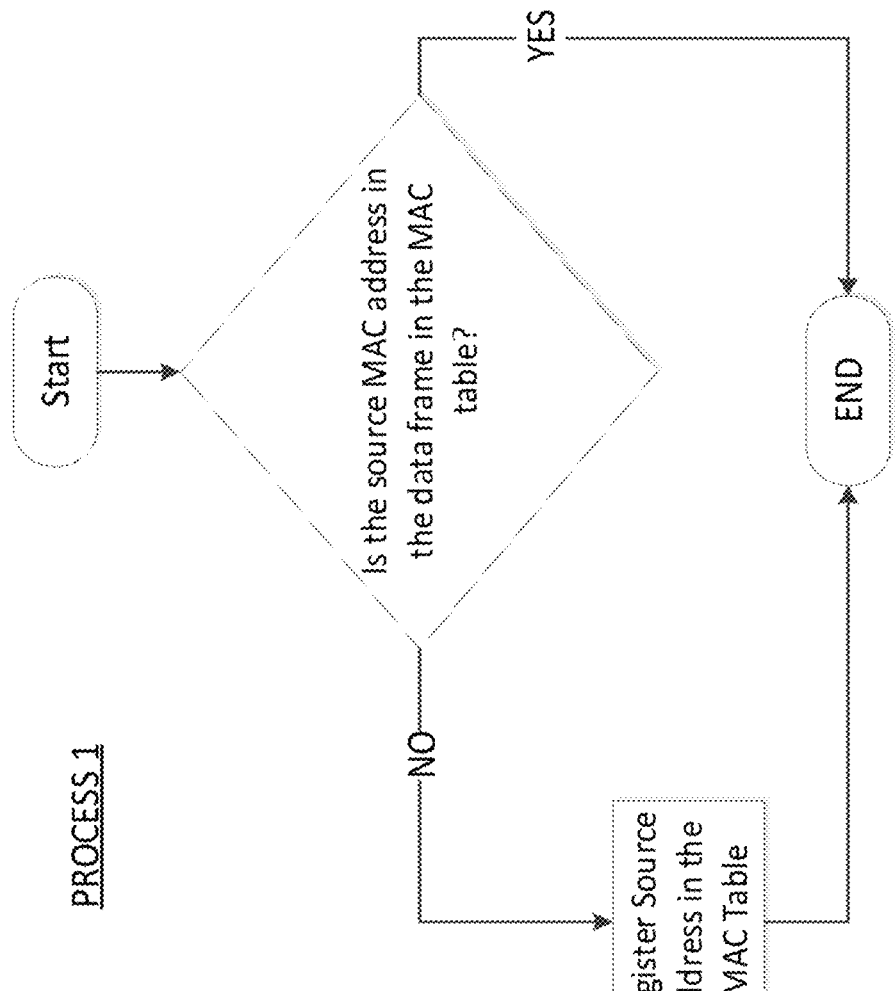
FIG. 5 illustrates a process for registering a MAC address in a MAC table.

In step 404A, SW-1 checks whether or not a source MAC address in the received data frame is included in a MAC address table of SW-1. This check is denoted Process 1 and is shown in FIG. 5. If the source MAC address is not included in the MAC table, SW-1 registers the source MAC address in the MAC table and proceeds to sub-step 404B. If the source MAC address is already in the MAC table, the process proceeds to sub-step 404B.

In step 404B, SW-1 checks if the destination MAC address in the received data frame is a broadcast address. As an example, when a MAC destination address is specified as FF:FF:FF.FF.FF:FF it is known as a broadcast address.

If the answer is YES, the received data frame is considered a broadcast frame (404C). Rule 2a and Rule 2d apply, so SW-1 should flood this frame on all its ports except from the port from which the data frame was received. If SW-1 has ports connected to host nodes, or non-ILSP ports, i.e., these ports are access ports, SW-1 removes the SS-ID from the data frame (404E) and floods the data frame on these access ports (404F) except the port from which the data frame was received. If SW-1 also has ILSP ports, SW-1 floods the received data frame (including the SS-ID) on all the ILSP ports except the port from which the data frame was received (step 404D).

In step 404B, if the answer is NO, i.e., the data frame is not a broadcast frame, SW-1 checks (404G) if the destination MAC address in the data frame is already registered in the MAC table. If the answer is NO, the data frame is considered an unknown-unicast frame (404M). Thus an unknown-unicast frame means that the data frame includes a destination MAC address of a node but the switch (here SW-1) has no entry for that destination address in its MAC table. Also here Rule 2a and Rule 2d apply since this unknown-unicast frame is considered to be a broadcast frame. Therefore, SW-1 removes the SS-ID from the data frame (404E) and SW-1 floods the data frame on its access ports (404F), and SW-1 floods the received data frame (including the SS-ID) on all the ILSP ports except the port from which the data frame was received (step 404D).

In step 404G, is the answer is YES i.e., the destination MAC address in the data frame is already registered in the MAC table of SW-1, this data frame is considered a known-unicast frame (404H). In this case, SW-1 forwards the known-unicast frame out from a single port which is not the port from which the data frame is received. For this, SW-1 checks, using its SR-table if there is any SW-ID assigned to a port number that is associated with the destination MAC address. In other words, SW-1 checks if the destination MAC address is on an access port or on a ILSP port (404I). If the answer is YES, i.e., the destination is on an access port, Rule 2a applies in that SW-1 removes the SS-ID from the known-unicast frame and forwards the frame (404L) to the host node that is connected to this access port. If the answer is NO, i.e., the destination is on an ILSP port according to the SR-table, Rule 2d applies in that SW-1 forwards the known-unicast frame (404J) including the SS-ID to the switch device having the SW-ID on the ILSP port.

Figure 6:
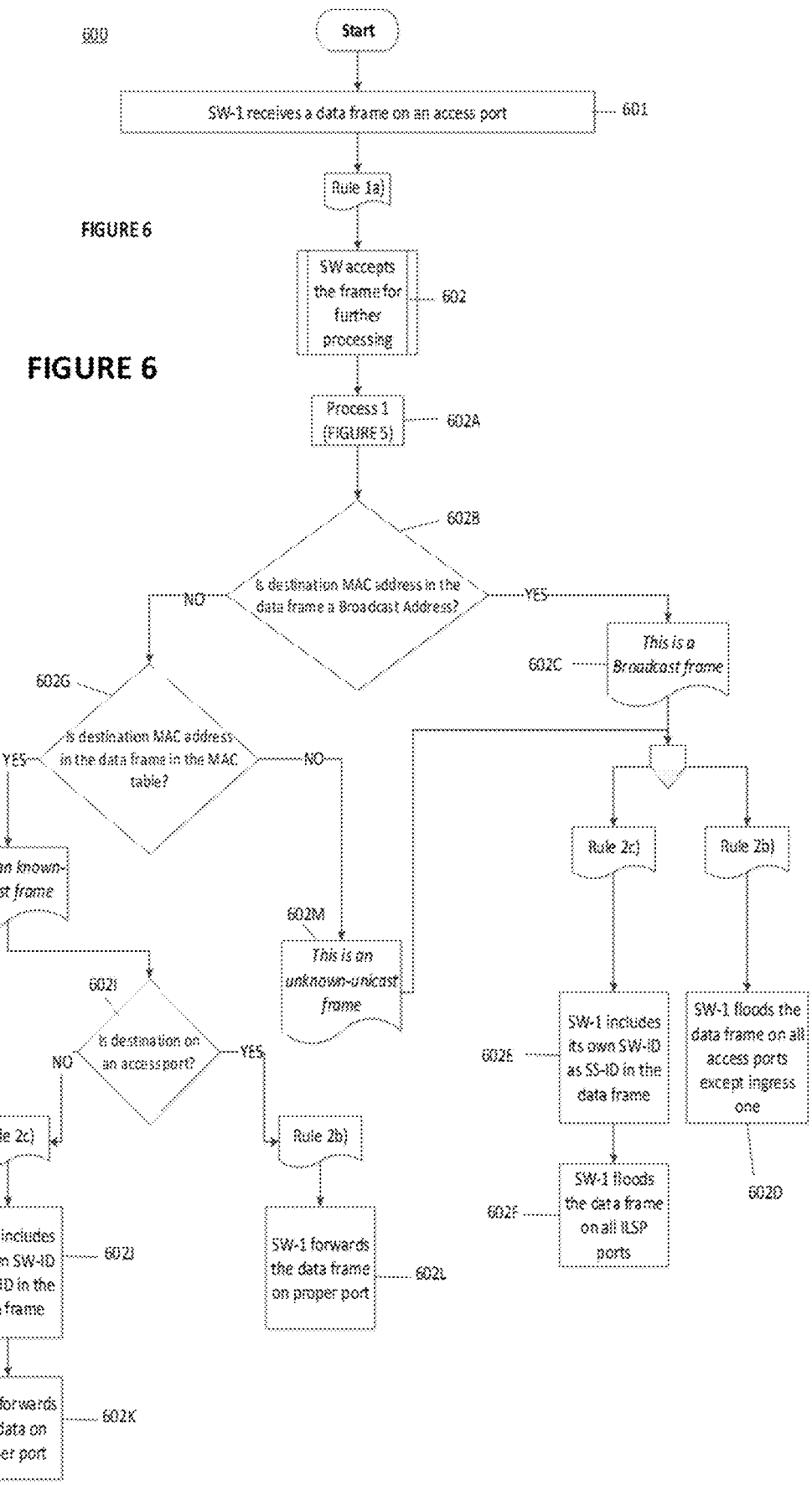
FIG. 6 is another flowchart illustrating different scenarios making use of the method according to the embodiments herein.

Referring to FIG. 6, there is illustrated a flowchart of a method according to some embodiments herein. In this case, it is assumed that a switch device (here SW-1) receives a data frame directly from a host node on an access port, i.e., not an ILSP port.

In step 601, SW-1 receives a data frame on an access port from a host node. Rule 1a applies, SW-1 accepts the data frame and this frame has no SS-ID included in it.

In step 602, Process 1 is performed (see FIG. 5). SW-1 checks whether or not a source MAC address in the received data frame is included in a MAC address table of SW-1. If the source MAC address is not included in the MAC table, SW-1 registers the source MAC address in the MAC table and proceeds to step 602B. If the source MAC address is already in the MAC table, the process proceeds to the same step 602B.

Step 602B is similar to previously described step 404B. SW-1 checks if the destination MAC address in the received data frame is a broadcast address (e.g. FF:FF:FF:FF:FF:FF).

If the answer is YES, the received data frame is considered a broadcast frame (602C). Rule 2b and Rule 2c apply. According to Rule 2b, SW-1 floods the received broadcast frame on all its access ports except from the port from which the data frame was received (602D); and according to Rule 2c, SW-1 includes its own SW-ID (e.g., SW-1) as SS-ID in the received data frame (602E) and floods this data frame, including this SS-ID, on all ILSP ports (602F). Hence, the data frame on the access port(s) is sent to host nodes or non-ILSP switch devices, whereas the data frame including the SS-ID of SW-1 is sent on the ILSP port(s) to ILSP switch devices (e.g., SW-2). Below are examples of the broadcast frame with and without the SS-ID. The source MAC address from which SW-1 received the broadcast frame is exemplified as xx:xx:xx:xx:xx:xx.

Broadcast Frame to Send on ILSP Port(s) in Step 602F

| L 2 | | ILSP | L 3 | FCS |
|---|---|---|---|---|
| Destination MAC | Source MAC | SS-ID | . . . | X |
| FF:FF:FF:FF:FF:FF | xx:xx:xx:xx:xx:xx | SW-1 | | |

Broadcast Frame to Send on Access Port(s) in Step 602D

| | L 2 | | L 3 | FCS |
|---|---|---|---|---|
| Destination MAC FF:FF:FF:FF:FF:FF | Source MAC xx:xx:xx:xx:xx:xx | | . . . | X |

In step 602B, if the answer is NO, i.e., if the data frame is not a broadcast frame, SW-1 checks (602G) if the destination MAC address in the data frame is already registered in the MAC table of SW-1. If the answer is NO, the data frame is considered an unknown-unicast frame (602M). Similarly to the case when the frame is a broadcast frame, Rule 2b and Rule 2c apply. According to Rule 2b, SW-1 floods the received unknown-unicast frame on all its access ports except from the port from which the data frame was received (602D); and according to Rule 2c, SW-1 includes its own SW-ID (e.g., SW-1) as SS-ID in the received data frame (602E) and floods this data frame, including this SS-ID, on all ILSP ports (602F). Hence, the data frame on the access port(s) is sent to host nodes or non-ILSP switch devices, whereas the data frame including the SS-ID of SW-1 is sent on the ILSP port(s) to ILSP switch devices (e.g. SW-2).

In step 602G, is the answer is YES, i.e., the destination MAC address in the data frame is already registered in the MAC table of SW-1, this data frame is considered a known-unicast frame (602H). In this case, SW-1 forwards the known-unicast frame out from a single port which is not the port from which the data frame is received. For this, SW-1 checks, using its SR-table if there is any SW-ID assigned to a port number that is associated with the destination MAC address. In other words SW-1 checks if the destination MAC address is on an access port or on a ILSP port (602I). If the answer is YES, i.e., the destination is on an access port, Rule 2b applies in that SW-1 send the known-unicast frame on proper access port (602L), e.g., to a host node that is connected to this access port. If the answer is NO, i.e., the destination is on an ILSP port according to the SR-table, Rule 2c applies in that SW-1 includes its own SW-ID (SW-1) as SS-ID in the known-unicast frame (602J) and forwards the known-unicast frame (602K) including the SS-ID to the switch device having the SW-ID on the ILSP port.

In the following, the previously described general principles of the ILSP method will now be applied to the network topology shown in FIG. 3, for different types of data frames.

Broadcast Frame

Assuming now that host node N-X 304 connected to SW-A 301 wants to send out an ARP (Address resolution Protocol) request in order to fetch the MAC address of another host node/device, e.g., of host node N-Z 306 which is shown connected to SW-C 303. The ARP request is a type of a broadcast frame. An example of this broadcast frame is shown below. The source MAC address xx:xx:xx:xx:xx:xx is that of N-X 304.

| | L 2 | | L 3 | FCS |
|---|---|---|---|---|
| Destination MAC FF:FF:FF:FF:FF:FF | Source MAC xx:xx:xx:xx:xx:xx | | . . . | X |

SW-A 301 receives this frame on port 8 and since there is no SS-ID field inside the frame, SW-A 301 applies some of the steps shown in FIG. 6.

1. SW-A 301 checks its MAC address table to see if there is any entry registered for the source MAC address included in this frame as previously described in conjunction with step 602A in FIG. 6. Since SW-A 301 does not include this source MAC address, SW-A 301 registers it in its MAC table as shown below:

SW-A MAC ADDRESS TABLE

| Destination | Port |
|---|---|
| xx:xx:xx:xx:xx:xx | 8 |

So, from now on, if SW-A 301 receives any data frame destined to host node N-X 304 it knows which port to use for forwarding the frame, which is port 8.

2. Since the frame is a broadcast frame, SW-A 301 should flood this frame out of all its ports except port 8 from which the frame was received. According to the SR-Table of SW-A 301, which is repeated below, SW-A 301 is connected to two ILSP switch devices SW-B on port 2 and SW-C on port 1.

SR-TABLE "A"

| Destination | Port | Hop |
|---|---|---|
| SW-B | 2 | 1 |
| SW-C | 1 | 1 |

SW-A 301 applies Rule 2c), i.e., SW-A 301 includes its own SW-ID (=SW-A) as SS-ID in the data frame and floods the data frame on both ports.

The ready to send broadcast frame is shown below:

| | L2 | ILSP | L3 | FCS |
|---|---|---|---|---|
| Destination MAC FF:FF:FF:FF:FF:FF | Source MAC xx:xx:xx:xx:xx:xx | SS-ID SW-A | . . . | X |

Hence, this broadcast frame is sent to SW-B 302 on ILSP port 2 and to SW-C 303 on ILSP port 1.

As an extra explanation, one can see that there is a physical loop in the domain since the traffic flow has two paths:
Path-1: N-X→SW-A→SW-B→SW-C→SW-A→ . . . .
Path 2: N-X→SW-A→SW-C→SW-B→SW-A→ . . . .
Path-1: N-X→SW-A→SW-B→SW-C→SW-A→ . . . .

After SW-A 301 floods the broadcast frame out from port 2, the frame arrives to SW-B 302 on port 2 (see FIG. 3). As a new frame arrives to SW-B 302, SW-B 302 checks if there is already an SS-ID field in the frame which is SW-A. As the frame arrives from port 2, SW-B checks its SR-Table (see below) to determine what SW-ID is assigned to port 2. According to the SR-Table of SW-B 302 it is SW-A.

SR-TABLE "B"

| Destination | Port | Hop |
|---|---|---|
| SW-A | 2 | 1 |
| SW-C | 1 | 1 |

Since this entry (SW-A) is the same with the SS-ID in the received frame, SW-B 302 accepts the frame adds the source MAC address of the frame into its MAC address table as shown below:

SW-B MAC ADDRESS TABLE

| Destination | Port |
|---|---|
| xx:xx:xx:xx:xx:xx | 2 |

This path is the shortest path from SW-B 301 to reach N-X 304 since only one hop is between SW-A 301 and SW-B 302.

Since the frame is a broadcast frame, SW-B 302 also should flood this frame on all its ports except port 2 from which the frame was received. This means ILSP port 1 and access port 8. Hence, at this stage, Rule 2a and Rule 2d following step 404C apply (see FIG. 4).

According to the SR-table of SW-B 302, port 1 is connected SW-C 303 and port-8 is connected to node N-Y 305. So the ready to send frame on each port is different.

Frame on ILSP port 1 (the frame is sent as received (step 404D in FIG. 4)

| | L 2 | | ILSP | L 3 | FCS |
|---|---|---|---|---|---|
| Destination MAC | Source MAC | | SS-ID | | |
| FF:FF:FF:FF:FF:FF | xx:xx:xx:xx:xx:xx | | SW-A | | X |

Frame on access port 8 (the SS-ID is removed before sending in to N-Y 305 (step 404E and 404F in FIG. 4)

| | L 2 | | L 3 | FCS |
|---|---|---|---|---|
| Destination MAC | Source MAC | | | X |
| FF:FF:FF:FF:FF:FF | xx:xx:xx:xx:xx:xx | | | |

A copy of the frame arrives to SW-C 303 on ILSP port 2. SW-C 303 checks its SR-Table and determines that the assigned SW-ID for this ILSP port 2 is SW-B.

SR-TABLE "C"

| Destination | Port | Hop |
|---|---|---|
| SW-B | 2 | 1 |
| SW-A | 1 | 1 |

SW-C 303 compares this SW-ID (SW-B) with the SS-ID (SW-A) in the data frame and since they are different, SW-C 303 applies Rule 1c and discards this broadcast frame with no further processing. This corresponds to 403 in FIG. 4.

Hence, path 1 ends here with no success for the frame to reach its destination node N-Z 306. But during this process the MAC address table of SW-B 302 gets updated to know how to it can reach N-X 304 and also the frame was forwarded to all connected ports to SW-B to see if N-Z is connected there or not. And at the end of the process, the data frame is discarded properly and loops is efficiently prevented.

Path-2: N-X→SW-A→SW-C→SW-B→SW-A→ . . . .

The frame arrives to SW-C 303 on ILSP port 1. SW-C 303 checks its SR-table to determine what SW-ID is assigned to this ILSP port 1.

SR-Table "C"

| Destination | Port | Hop |
|---|---|---|
| SW-B | 2 | 1 |
| SW-A | 1 | 1 |

According to the SR-table of SW-C 303, it is SW-A which is then compared to the SS-ID (SW-A) in the received frame. As there are the same, SW-C 303 process forward the data frame.

SW-C 303 adds the source MAC address of the frame in its MAC address table:

SW-C MAC address Table

| Destination | Port |
|---|---|
| xx:xx:xx:xx:xx:xx | 1 |

Then as this is a broadcast frame SW-C 303 should flood this frame on all its ports except port 1 from which the frame was received. There are two ports, one ILSP port 2 and one access port 8.

Frame sent on port 2 of SW-C (based on SR-table of SW-C this port in connected to an ILSP switch SW-B 302 on port 1):

| | L2 | | | | |
|---|---|---|---|---|---|
| Destination MAC | Source MAC | | ILSP SS-ID | L3 | FCS |
| FF:FF:FF:FF:FF:FF | xx:xx:xx:xx:xx:xx | | SW-A | | X |

SR-Table "C"

| Destination | Port | Hop |
|---|---|---|
| SW-B | 2 | 1 |
| SW-A | 1 | 1 |

When SW-B 302 receives this frame on ILSP port 1, its uses its SR-table to determine what assigned SW-ID is for this port 1. It is SW-C.

SR-Table "B"

| Destination | Port | Hop |
|---|---|---|
| SW-A | 2 | 1 |
| SW-C | 1 | 1 |

SW-B 302 compares this SW-ID (SW-C) with the SS-ID in the frame (SW-A) and since there are the same, SW-B 305 discards the data frame with no more process (step 403 in FIG. 4). Therefore a loop is also prevented.

As mentioned earlier, SW-C 303 should also flood the frame on port 8, which is an access port. SW-C 303 applies Rule 2a and removes the SS-ID from the data frame and floods the data frame on port 8 to N-Z 306 which is the target of the frame. This corresponds to steps 404E and 404F in FIG. 4.

Path 2 ends in SW-B to prevent a loop but the ARP request successfully reached its target which is N-Z 306.

Unknown Unicast Frame

As previously disclosed, unknown-unicast frame means that a frame has a destination MAC address of a node but the switch device does not have an entry for that destination in its MAC address table.

With reference to FIG. 3, assume that N-X 304 wants to send a frame to N-Z 306 but this time the MAC address of N-Z 306 (zz:zz:zz:zz:zz:zz) is known to N-X 304 having MAC address (xx:xx:xx:xx:xx:xx). Assume that none of the switch devices has any entry for N-Z 306 in their MAC address table (check 602G in FIG. 6). In this case the frame generated by N-X 304 that arrives to SW-A 301 is as shown below:

| L2 | | | |
|---|---|---|---|
| Destination MAC | Source MAC | L3 | FCS |
| zz:zz:zz:zz:zz:zz | xx:xx:xx:xx:xx:xx | | X |

SW-A 301 applies Rule No. 1 to this arrived frame. Because this is a frame with no SS-ID, SW-A 301 assumes that it arrives directly from a host node or a non-ILSP switch device. SW-A 301 adds the source MAC address of the frame into its MAC address table if it is not already there and also does a lookup in its MAC address table to see if there is any entry for this destination. The MAC address table of SW-A 301 is as shown below:

| SW-A MAC address Table | |
|---|---|
| Destination | Port |
| xx:xx:xx:xx:xx:xx | 8 |

Assuming that SW-A 301 has already an entry for xx:xx:xx:xx:xx:xx in its MAC address table, SW-A 301 does not need to add it. But there is no entry for N-Z 306 in its MAC address table. So SW-A 31 should floods this frame like a broadcast. Before that the SW-A 301 includes its SW-ID as SS-ID in the frame and floods the frame on ILSP port 2 towards SW-B 302 and on ILSP port 1 towards SW-C 303. The rest of the process is exactly same as previously described and loops are effectively prevented. As a summary, the unknown-unicast frame has two paths:

Path-1: N-X->SW-A->SW-B->SW-C->SW-A-> . . .
   Frame arrives to SW-B 302
   Based on Rule No. 1 it accepted by SW-C 302 for further processing
   SW-B 302 also floods this frame based on Rule No. 2 as there is no entry for the destination MAC address of the frame
   Frame arrives to SW-C 303
   Based on Rule 1c, the frame is discarded by SW-C 303 with no further process because of the mismatch between the SS-ID included in the frame and the assigned SW-ID for the port receiving the frame at SW-C as previously described.

Path-2: N-X->SW-A->SW-C->SW-B->SW-A-> . . .
   Frame arrives to SW-C 303
   Based on Rule No. 1 it accepted by SW-C 303 for further processing.
   SW-C 303 also floods this frame based on Rule No. 2 as there is no entry for the destination MAC address of the frame
   One copy of the frame reaches to N-Z 306 which is the target as previously described.
   Another copy of the frame reaches to SW-B 302
   Based on Rule 1c the frame is discarded by SW-B 302 with no further process as previously described.

Known-Unicast Frame

Known-Unicast means not only frame has a destination MAC address of a node but also the switch device does have an entry for that destination in its MAC address table.

This time we assume that N-Z 306 wants to reply to N-X 304 ARP request. N-Z 306 known the MAC address of N-X 304. So in this case a known-unicast frame generated by N-Z 306 and arrives to SW-C 303 is as shown below:

| L2 | | | |
|---|---|---|---|
| Destination MAC | Source MAC | L3 | FCS |
| xx:xx:xx:xx:xx:xx | zz:zz:zz:zz:zz:zz | | X |

By applying previously described rule 1a, SW-C 303 accepts the frame and assumes it arrives directly from a node or a no-ILSP switch. SW-C 303 tries to add the source MAC address of the frame into its MAC address table if it is not already there. The SW-C MAC address table is as shown below:

| SW-C MAC address Table | |
|---|---|
| Destination | Port |
| xx:xx:xx:xx:xx:xx | 1 |

In this case, SW-C 303 adds the MAC address of the N-Z 306 in its MAC address table. So the MAC address table will become:

| SW-C MAC address Table | |
|---|---|
| Destination | Port |
| xx:xx:xx:xx:xx:xx | 1 |
| zz:zz:zz:zz:zz:zz | 8 |

SW-C 303 does a lookup in its MAC address table to see if there is any entry for this destination xx:xx:xx:xx:xx:xx. According to the MAC address table of SW-C 303 the answer is yes and the destination is on port 1. So SW-C 303 forwards the frame just on port 1. In this scenario there is no two paths for the frame as it is a known-unicast frame with specific path.

Now it's time SW-C 303 applies Rule 2 based on SR-Table C:

| SR-Table "C" | | |
|---|---|---|
| Destination | Port | Hop |
| SW-B | 2 | 1 |
| SW-A | 1 | 1 |

As there is an SW-ID assigned to port 1, SW-C 303 knows that this port is connected to an ILSP switch (SW-A) so it includes/adds its SS-ID (SW-C) into the frame before sends out the frame:

| L2 | | | | |
|---|---|---|---|---|
| Destination MAC | Source MAC | ILSP SS-ID | L3 | FCS |
| xx:xx:xx:xx:xx:xx | zz:zz:zz:zz:zz:zz | SW-C | | X |

When the frame reaches to SW-A 301. Rule 1 is applied. The first action is to compare the SS-ID field of the arrived frame which is SW-C with the assigned SW-ID to the receiver for port 1 using the SR-Table of SW-A 301:

| SR-Table "A" | | |
|---|---|---|
| Destination | Port | Hop |
| SW-B | 2 | 1 |
| SW-C | 1 | 1 |

According to the SR-Table A it is SW-C. As this entry is the same with SS-ID on the arrived frame, SW-A 301 accepts the frame and start to process it. SW-A 301 adds the source MAC address of the frame into its MAC address table since as it is not already there:

| SW-A MAC address Table | |
|---|---|
| Destination | Port |
| xx:xx:xx:xx:xx:xx | 8 |
| zz:zz:zz:zz:zz:zz | 1 |

Then SW-A 301 looks at its MAC address table to see if there is any entry for the destination address in the frame. Refer to the above MAC address table of SW-A, there is an entry for that destination (xx:xx:xx:xx:xx:xx) which points to port 8.

Before the frame gets forwarded to that specific port, Rule 2a is applied to the frame. SW-A 301 looks at its SR-Table to see if there is any assigned SW-ID for this port 8 or not:

| SR-Table "A" | | |
|---|---|---|
| Destination | Port | Hop |
| SW-B | 2 | 1 |
| SW-C | 1 | 1 |

As there is no entry for port-8, SW-A 301 understands that the other side of port 8 either is a host node or a non-ILSP switch. Then, SW-A 301 removes the SS-ID and forwards a standard frame out to port 8 to N-X 304.

As demonstrated above, loops are effectively prevented independently on the type of frame that is sent in the network topology. In addition to this advantage there are additional advantages that are achieved by the embodiments described herein and which include at least the following:

There is no need to disable any link in the topology to prevent loops.

All switch devices and ports are up and operational.

The flow of different frame's types including, broadcast, unknown-unicast, or known-unicast frames do not cause any issue on network topology.

Broadcast or unknown-unicast frames pass all switch devices and ports but not more than one time.

Known-unicast frame should not pass any extra path rather than its right path.

There are no duplicate frame issue.

A frame not only is delivered to its destination but it also arrives there through the shortest possible path. All switches' MAC address tables are filled correctly. Further, freezing periods are not used, as it is not necessary. In addition, the ILSP method is totally transparent to end-nodes or host nodes, which means that no changes are required at the end-nodes.

A summary of the method for preventing loops in a network topology comprising a plurality of switch devices (301, 302, 303), comprises:

assigning, to each switch device (301, 302, 303), a unique switch identification number, SW-ID;

exchanging each SW-ID between all switch devices (301, 302, 303);

building, for each switch device (301, 302, 303), a routing table based on said received SW-IDs, so that switch devices (301, 302, 303) can reach each other; wherein each entry in the routing table is associated with a switch device, and includes an assigned SW-ID of the switch device; a dedicated port number and a number of hops to reach the switch device, wherein the number of hops corresponds to the shortest path to reach the switch device;

The method further comprising:

when receiving (401), at a first switch device (301), a data frame, from a second switch device (302), that includes a source switch identification number, SS-ID, assigned to the second switch device (302); and the data frame is received at a port of the first switch device (301);

if, according to the routing table of the first switch device (301), the assigned SW-ID for this port is different from the SS-ID included in the data frame, discarding (403) the data frame; otherwise, processing (404) forward the data frame.

According to an embodiment and as described earlier, processing forward the data frame includes:

if the data frame is a broadcast frame (404C) or an unknown-unicast frame, flooding (404D) the data frame out from each port of the first switch device (301) that is connected to other switch devices (302, 303) except from the port from which the data frame was received; and removing (404E) the SS-ID from the data frame and flooding (404F) the data frame without the SS-ID frame out from each port of the first switch device (301) that is directly connected to at least one host node (304);

if the data frame is a known-unicast frame (404H); forwarding (404J, 404L) the data frame out from a single port which is not the port from which the data frame was received if the data frame is a known-unicast frame (404H):

checking (404I), using the routing table of the first switch device (301), if there is any SW-ID assigned to a port number that is associated with a MAC destination address in the data frame; and—if there is no SW-ID, removing (404K) the SS-ID from the data frame and forwarding (404L) the data frame, out from said associated port, to its destination MAC address; and if there is a SW-ID, forwarding (404J) the data frame to the switch device having the SW-ID.

Figure 7:
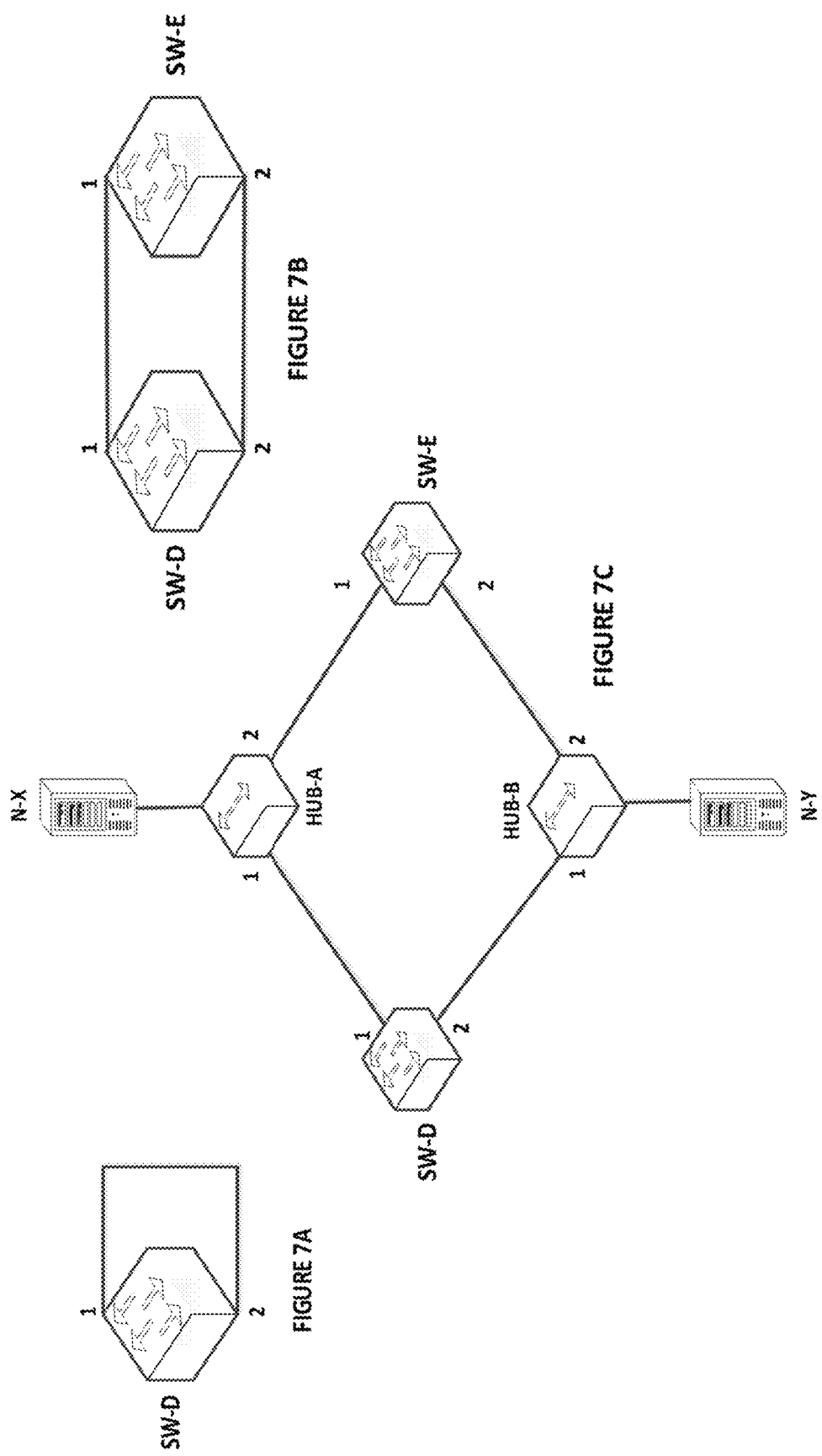
FIG. 7A-7C illustrates rare situations that may occur in switching technology.

The method further comprises:

when receiving (601), at a switch device (301) a data frame from a host device (304) connected to the switch device (301), —if the data frame is a broadcast frame (602C) or a unknown-unicast frame (602H), adding or including (602E), in the data frame, the SW-ID of the switch device (301) as SS-ID and flooding (602F) the data frame including the SS-ID, out from each port of the switch device (301) that is connected to other switch devices (302, 303) except from the port from which the data frame was received; and further flooding (602D) the received data frame, out from each port of the switch device that is directly connected to at least one host node, except from the port from which the data frame was received. If the data frame is a known-unicast frame (602H), checking (602I), using the routing table, if there is any SW-ID assigned to a port number that is associated with a MAC destination address in the data frame; and—if there is a SW-ID, adding or including (602J), in the data frame, the SW-ID of the switch device (301) as SS-ID and forwarding (602K) the data frame including the SS-ID, out from said port; and—if there is no SW-ID, forwarding (602L) the data frame, out from said associated port, to its destination MAC address. It should be noted that there are some rare situations in switching technology that may cause loops. FIG. 7A-7C illustrate three examples of such situations.

FIG. 7A illustrates a scenario where two ports (1, 2) of a switch device SW-D are directly connected to each other by means of a cable.

FIG. 7B illustrates a scenario where two switch devices SW-D and SW-E are connected directly to each other, by means of cables, with more than one connection. Ports 1 and 2 of SW-D are connected to respective ports 1 and 2 of SW-E.

FIG. 7C illustrates a scenario where two switch devices SW-D and SW-E are connected to each other through shared media (Hubs, HUB-A, and HUB-B). To each Hub is connected a host device N-X resp. N-Y.

In order to handle these situations, the following two rules Rule 3 and Rule 4 may be introduced, which may be added as complement to Rules 1 and 2 previously described.

Rule 3: if a switch device receives its own SW-ID with Hop=0 on a port, it deactivates that port.

Rule 4: When a switch device receives the same SW-ID on different ports with Hop=0, it keeps one port enabled and deactivate the other ports.

With reference to FIG. 7A, when ports 1 and 2 of SW-D are directly connected to each other by means of a cable, a loop may occur. Actually, such a situation is not useful in a network topology, but it may occur by a mistake done by a user. So, according to Rule 3, a loop is prevented by deactivating a connection. For example by:
 a. SW-D starts to advertise its SW-ID out from port 1.
 b. SW-D receives its own SW-ID from port 2 with Hop=0
 c. According to Rule No. 3, SW-D deactivates port 1

With reference to FIG. 7B, when SW-D and SW-E are directly connected to each other with more than one connection (i.e., with more than one cable).

This situation may also cause a loop. The only valid reason and benefit for such a connections is to make those connections as a port-channel which looks like a single port to a switch device with no loop. Otherwise there is no reason to have such a connection. One solution for such a condition is to deactivate all extra links between the two switch devices if they are not part of a port-channel. This time Rule 4 will be applied to address the issue.

If both links between SW-D and SW-E are configured as a port-channel then it looks like a single link to both switches and there is no problem. But if those are not configured as port-channel, the process is as below:
 a. Step-1, one of these switches, for instance SW-D starts first to advertise its own SW-ID from port 1 and port 2.
 b. Step-2, SW-E receives SW-D's ID on port 1 and port 2 with Hop=0.
 c. According to Rule 4, one SW-ID is received on more than of one port on SW-E with Hop=0. So, SW-E keeps up one of these ports and deactivates the other one. By doing this loops are prevented.

With reference to FIG. 7C, two switch devices SW-D and SW-E are connected to each other via, e.g., Hubs.

This situation is very rare. However, if it occurs, it has to be handled. The following explains the issue in more detail. Based on FIG. 7C, all three major loop issues previously described may occur in such a network topology and which include: Broadcast storm, frame duplication and MAC Address Table corruption.

Assume that N-X sends a broadcast frame like an ARP request out. The process works as follows:
 1—Broadcast frame reaches to HUB-A.
 2—HUB-A floods frame out of port 1 and port 2
 3—Both SW-D and SW-E receive the frame and update their MAC address table to register that port 1 is the path to reach to N-X
 4—Both SW-D and SW-E flood the frame out of their port 2 toward HUB-B
 5—HUB-B floods these two received frames with no more action.
  a. Two copies of the frame reach to N-Y (frame duplication issue).
  b. One copy of the frame reach to SW-D and one reach to SW-E
 6—Both SW-D and SW-B update their MAC address table that port 2 is the path to reach to N-X (MAC Address Table corruption).
 7—SW-D and SW-E flood the frame again as it is a broadcast frame (Broadcast storm issue).

This situation logically is similar with the previous one when two switch devices are connected to each other with more than one link (FIG. 7B). To address all the above issues it is enough to apply Rule 4 to the domain. So, again, one port get deactivated to solve the issue.

Figure 8:
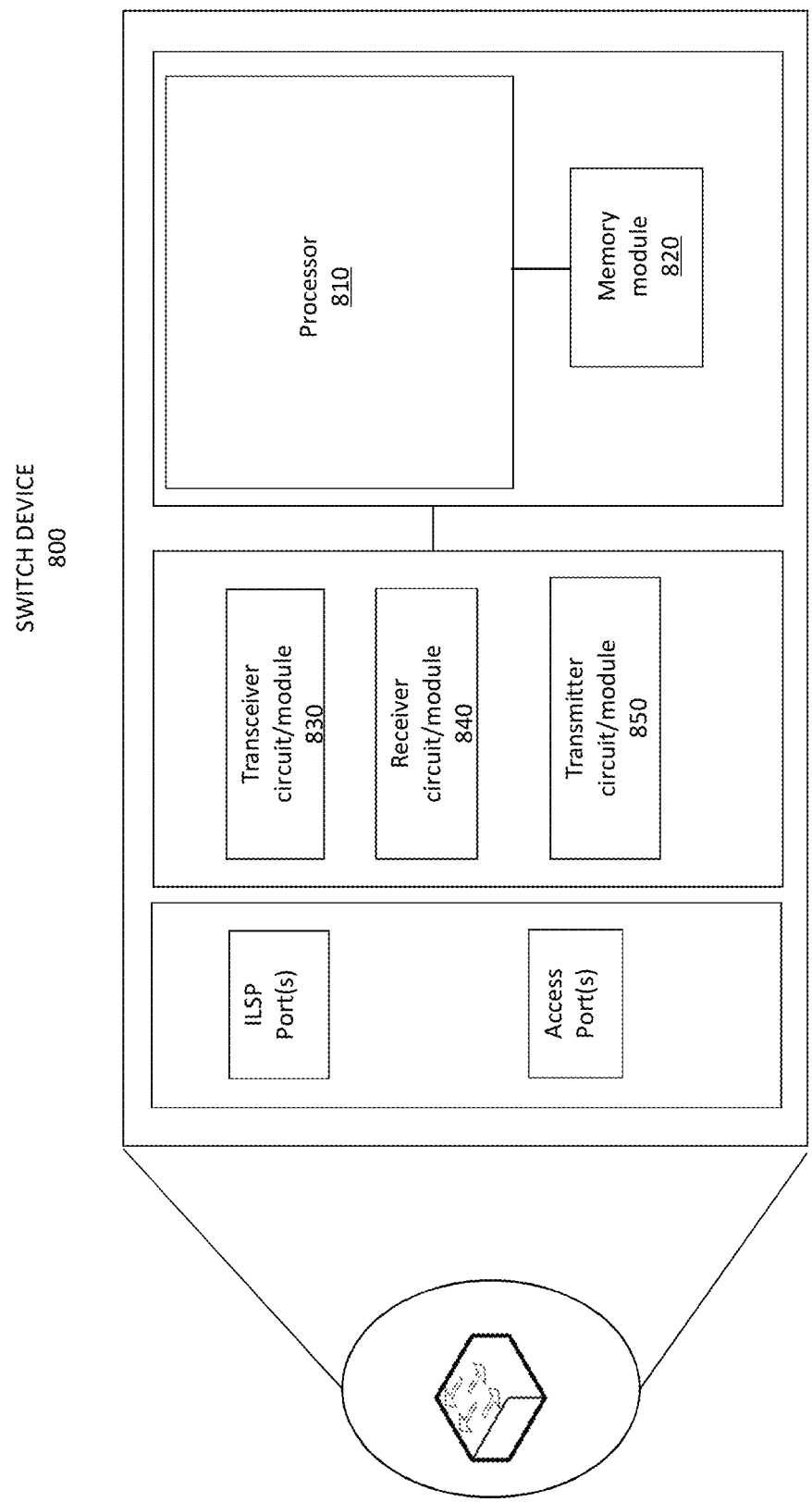
FIG. 8 illustrates an example of a block diagram depicting a switch device according to some embodiments herein.

To perform the ILSP method described earlier, a switch device 800 is provided as depicted in FIG. 8 in accordance with some embodiments herein. The switch device 800 comprises a processing circuit or a processing module or a processor 810; a memory module 820; a receiver circuit or receiver module 840; a transmitter circuit or transmitted module 850; and a transceiver circuit or transceiver module 830 which may include the transmitter circuit 850 and the receiver circuit 840. The switch device 800 being a network switch is also shown including ports, which may be ILSP ports to connect to other switch devices and/or access ports to connect to host nodes or non-ILSP switch devices. The switch device 800 is also referred to here as an ILSP switch device. The switch device 800 may be used in any type of network including small, medium and enterprise or in private networks. The switch device 800 may be used in wired or wireless networks and may be connected using cables to host nodes and other switch devices or other suitable network devices and may additionally support any radio technology including 2G, 3G, 4 G, 5G, Wifi, Wimax or a combination thereof.

The processing module/circuit 810 includes a processor, microprocessor, an application specific integrated circuit (ASIC), field programmable gate array (FPGA), or the like, and may be referred to as the "processor 810." The processor 810 controls the operation of the switch 800 and its components. Memory (circuit or module) 820 includes a random access memory (RAM), a read only memory (ROM), and/or another type of memory to store data and instructions that may be used by processor 810. In general, it will be understood that the switch 800 in one or more embodiments includes fixed or programmed circuitry that is configured to carry out the operations in any of the embodiments disclosed herein.

The processor 810 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 810 to carry out the operations of the switch 800 disclosed herein. Further, it will be appreciated that the switch 800 may comprise additional components not shown in FIG. 8.

The switch device 800 prevents the occurrence of loops in a network technology comprising a plurality of switch devices, wherein each switch device is assigned a SW-ID, the switch device 800 is operative to: exchange the assigned SW-ID with all switch devices; receive from each switch device its assigned SW-ID, build a routing table based on said received SW-IDs; wherein each entry in the routing table is associated with a switch device, and includes an assigned SW-ID of the switch device; a dedicated port number and a number of hops to reach the switch device, wherein the number of hops corresponds to the shortest path to reach the switch device. When the switch device 800 receives a data frame from another switch device that includes a source switch identification number (SS-ID) assigned to said another switch device; and the data frame is received at a port of the switch device 800; if, according to the routing table of the switch device 800, the assigned SW-ID for this port is different from the SS-ID included in the data frame, the switch device 800 is operative to: discard the data frame; otherwise, process forward the data frame.

As previously described, the switch device 800 is operative to process forward the data frame as follows: if the data frame is a broadcast frame or an unknown-unicast frame, the switch device 800 is operative to flood the data frame out from each port of the first switch device 800 that is connected to other switch devices except from the port from which the data frame was received; and to remove the SS-ID from the data frame and to flood the data frame without the SS-ID frame out from each port of the switch device 800 that is directly connected to at least one host node (if any). If the data frame is a known-unicast frame; the switch device 800 is operative to forward the data frame out from a single port which is not the port from which the data frame is received.

If the data frame is a known-unicast frame, the switch device 800 is operative to: check, using the routing table, if there is any SW-ID assigned to a port number that is associated with a MAC destination address in the data frame; and if there is no SW-ID, to remove the SS-ID from the data frame and to forward the data frame, out from said associated port, to its destination MAC address; and if there is a SW-ID, to forward the data frame to the switch device having the SW-ID. When the switch device 800 receives a data frame from a host device connected to the switch device 800; if the data frame is a broadcast frame or a unknown-unicast frame, the switch device is operative to add or include, in the data frame, the SW-ID of the switch device 800 as SS-ID and to flood the data frame including the SS-ID, out from each port of the switch device 800 that is connected to other switch devices except from the port from which the data frame was received; and the switch device 800 is further operative to flood the received data frame, out from each port of the switch device 800 that is directly connected to at least one host node (if any), except from the port from which the data frame was received.

If the data frame is a known-unicast frame, the switch device 800 is operative to: check, using the routing table, if there is any SW-ID assigned to a port number that is associated with a MAC destination address in the data frame; and if there is a SW-ID, to add or include, in the data frame, the SW-ID of the switch device as SS-ID and to forward the data frame including the SS-ID, out from said port; and if there is no SW-ID, to forward the data frame, out from said associated port, to its destination MAC address.

Additional operations that may be performed by the switch device have already been described and need not be repeated.

There is also provided a computer program comprising instructions which when executed on at least one processor 810 of the switch device 800 according to embodiments herein, cause the at least one processor 810 to carry out at least the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

The invention claimed is:

1. A method for preventing loops in a network topology comprising a plurality of switch devices, the method comprising:

assigning, to each switch device, a unique switch identification number, SW-ID;

exchanging each SW-ID between all switch devices;

building, for each switch device, a routing table based on said received SW-IDs, so that the switch devices can reach each other, each entry in the routing table associated with a switch device, and including an assigned SW-ID of the switch device, a dedicated port number, and a number of hops to reach the switch device, the number of hops corresponding to a shortest path to reach the switch device; and receiving, at a first switch device, a data frame from a second switch device that includes a single switch identification number, namely a source switch identification number, SS-ID, assigned to the second switch device, the data frame is received at a port of the first switch device;

when, according to the routing table of the first switch device, the assigned SW-ID for the port of the first switch device is different from the SS-ID included in the data frame, discarding the data frame, and when, according to the routing table of the first switch device, the assigned SW-ID for the port of the first switch device is not different from the SS-ID included in the data frame, processing forwarding the data frame, wherein processing forwarding the data frame comprises:

when the data frame is a broadcast frame or an unknown-unicast frame, flooding the data frame out from each port of the first switch device that is connected to other switch devices except from the port from which the data frame was received; and removing the SS-ID from the data frame and flooding the data frame without the SS-ID frame out from each port of the first switch device that is directly connected to at least one host node, and when the data frame is a known-unicast frame, checking, using the routing table of the first switch device, if there is any SW-ID assigned to a port number that is associated with a MAC destination address in the data frame; and when there is no SW-ID, removing the SS-ID from the data frame and forwarding the data frame out from said associated port to its destination MAC address; and when there is a SW-ID, forwarding the data frame to the switch device having the SW-ID.

2. The method according to claim 1, further comprising:

receiving, at a switch device, a data frame from a host device connected to the switch device;

when the data frame is a broadcast frame or a unknown-unicast frame, adding or including, in the data frame, the SW-ID of the switch device as SS-ID and flooding the data frame including the SS-ID out from each port of the switch device that is connected to other switch devices except from the port from which the data frame was received; and flooding the received data frame out from each port of the switch device that is directly connected to at least one host node except from the port from which the data frame was received;

when the data frame is a known-unicast frame, checking, using the routing table, if there is any SW-ID assigned to a port number that is associated with a MAC destination address in the data frame; and when there is a SW-ID, adding or including, in the data frame, the SW-ID of the switch device as SS-ID and forwarding the data frame including the SS-ID out from said port; and when there is no SW-ID, forwarding the data frame out from said associated port, to its destination MAC address.

3. A switch device for preventing loops in a network topology comprising a plurality of switch devices, wherein each switch device is assigned a unique switch-identification number, SW-ID, the switch device comprising a processor and a memory, said memory containing instructions executable by the processor wherein the switch device is operative to:

exchange the assigned SW-ID with all switch devices;
receive from each switch device its assigned SW-ID;
build a routing table based on said received SW-IDs, each entry in the routing table associated with a switch device, and including an assigned SW-ID of the switch device, a dedicated port number, and a number of hops to reach the switch device, the number of hops corresponding to the shortest path to reach the switch device; and receive a data frame from another switch device that includes a single switch identification number, namely a source switch identification number, SS-ID, assigned to said another switch device, the data frame being received at a port of the switch device;

when, according to the routing table of the switch device, the assigned SW-ID for this port is different from the SS-ID included in the data frame,
discard the data frame, and when, according to the routing table of the switch device, the assigned SW-ID for this port is not different from the 55-ID included in the data frame, process forward the data frame, wherein process forward the data frame comprises:

when the data frame is a broadcast frame or an unknown-unicast frame, flood the data frame out from each port of the switch device that is connected to other switch devices except from the port from which the data frame was received; and remove the SS-ID from the data frame and flood the data frame without the SS-ID frame out from each port of the switch device that is directly connected to at least one host node, and when the data frame is a known-unicast frame, check, using the routing table of the switch device, if there is any SW-ID assigned to a port number that is associated with a MAC destination address in the data frame; and when there is no SW-ID, remove the SS-ID from the data frame and forward the data frame out from said associated port to its destination MAC address; and when there is a SW-ID, forward the data frame to the switch device having the SW-ID.

4. A switch device according to claim 3, further operative to:

receive a data frame from a host device connected to the switch device;

when the data frame is a broadcast frame or a unknown-unicast frame, add or include, in the data frame, the SW-ID of the switch device as SS-ID and flood the data frame including the SS-ID out from each port of the switch device that is connected to other switch devices except from the port from which the data frame was received; and flood the received data frame out from each port of the switch device that is directly connected to at least one host node, except from the port from which the data frame was received; and when the data frame is a known-unicast frame, check, using the routing table, if there is any SW-ID assigned to a port number that is associated with a MAC destination address in the data frame; and when there is a SW-ID, add or include, in the data frame, the SW-ID of the switch device as SS-ID and forward the data frame including the SS-ID, out from said port; and when there is no SW-ID, forward the data frame out from said associated port, to its destination MAC address.

5. A method in a switch device for preventing loops in a network topology comprising a plurality of switch devices, wherein each switch device is assigned a unique switch-identification number, SW-ID, the method comprising:

exchanging the assigned SW-ID with all switch devices;
receiving from each switch device its assigned SW-ID;
building a routing table based on said received SW-IDs, each entry in the routing table associated with a switch device, and including an assigned SW-ID of the switch device, a dedicated port number, and a number of hops to reach the switch device, the number of hops corresponding to the shortest path to reach the switch device; and receiving a data frame from another switch device that includes a single switch identification number, namely a source switch identification number, SS-ID, assigned to said another switch device, the data frame being received at a port of the switch device, when, according to the routing table of the switch device, the assigned SW-ID for this port is different from the SS-ID included in the data frame, discarding the data frame, and when, according to the routing table of the switch device, the assigned SW-ID for this port is not different from the SS-ID included in the data frame, processing forward the data frame, wherein processing forward the data frame comprises:

when the data frame is a broadcast frame or an unknown-unicast frame, flooding the data frame out from each port of the switch device that is connected to other switch devices except from the port from which the data frame was received; and removing the SS-ID from the data frame and flood the data frame without the SS-ID frame out from each port of the switch device that is directly connected to at least one host node, and when the data frame is a known-unicast frame, checking, using the routing table of the switch device, if there is any SW-ID assigned to a port number that is associated with a MAC destination address in the data frame; and when there is no SW-ID, removing the SS-ID from the data frame and forward the data frame out from said associated port to its destination MAC address; and when there is a SW-ID, forwarding the data frame to the switch device having the SW-ID.

* * * * *